(12) United States Patent
Ailon et al.

(10) Patent No.: US 8,583,649 B2
(45) Date of Patent: Nov. 12, 2013

(54) METHOD AND SYSTEM FOR CLUSTERING DATA POINTS

(75) Inventors: Nir Ailon, New York, NY (US); Edo Liberty, New Haven, CT (US); Harishabd Khalsa, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/128,333

(22) PCT Filed: Nov. 10, 2009

(86) PCT No.: PCT/US2009/063794
§ 371 (c)(1),
(2), (4) Date: Jun. 18, 2012

(87) PCT Pub. No.: WO2010/054349
PCT Pub. Date: May 14, 2010

(65) Prior Publication Data
US 2012/0254183 A1    Oct. 4, 2012

Related U.S. Application Data

(60) Provisional application No. 61/198,785, filed on Nov. 10, 2008.

(51) Int. Cl.
*G06F 17/30* (2006.01)
(52) U.S. Cl.
CPC .............................. *G06F 17/30017* (2013.01)
USPC .......................................................... 707/738

(58) Field of Classification Search
USPC .......................................... 707/736–740, 749
See application file for complete search history.

(56) References Cited

U.S. PATENT DOCUMENTS 5,428,788 A    6/1995   Schwanke
6,421,668 B1   7/2002   Yakhini et al.

OTHER PUBLICATIONS

Nir Ailon et al., Fitting tree metrics: Hierarchical clustering and Phylogeny, 2005, IEEE, 73-82.*
A.K. Jain et al., Data Clustering: A Review, 1999, ACM, vol. 31, 264-323.*

* cited by examiner

*Primary Examiner* — Jean B Fleurantin
(74) *Attorney, Agent, or Firm* — King & Spalding LLP (57) ABSTRACT

Systems and methods for clustering a group of data points based on a measure of similarity between each pair of data points in the group are provided. A pairwise similarity function can be estimated for each pair of data points in the group. A clustering algorithm can be executed to create clusters and associate data points with the clusters using the pairwise similarity function. The algorithm can be iterated multiple times until a stopping condition is reached in order to reduce variance in the output of the algorithm. The pairwise similarity function for each pair of data points can be updated between iterations of the algorithm and the results of each iteration can be aggregated. The data in each data point associated with a cluster can be consolidated into a consolidated data point.

24 Claims, 7 Drawing Sheets

METHOD AND SYSTEM FOR CLUSTERING DATA POINTS

RELATED PATENT APPLICATIONS

This non-provisional patent application is a 35 U.S.C. §371 national phase patent application and claims priority to International Patent Application Number PCT/US2009/063794, filed Nov. 10, 2009, and entitled "Method and System for Clustering Data Points," which claims priority under 35 U.S.C. §119 to U.S. Provisional Patent Application No. 61/198,785, entitled, "Method And System For Clustering Data Points," filed Nov. 10, 2008, the complete disclosure of which is hereby fully incorporated herein by reference.

TECHNICAL FIELD

The invention generally relates to associating related data points with each other. In particular, the invention provides a method and system for clustering a set of data points based on a similarity function describing the similarity between pairs of data points, and then collecting data contained in the clustered data points to generate consolidated data.

BACKGROUND

Conventional clustering solutions typically treat computation of a similarity function between data points and a clustering process as one process, thus not allowing a practitioner to separate between the similarity function computation and the conversion of the similarity function into a proper clustering as two separate problems. Instead, the practitioner must determine how to embed the data points in a correct structure dictated by the clustering algorithm. This structure is typically a normed linear space, such as Euclidean space. In reality, similarity functions are rarely embeddable in such simple spaces and nonlinear similarity functions, such as decision trees, may be necessary to achieve better accuracy. Also, in typical clustering solutions, the number of clusters must be known in advance forcing the practitioner to guess the typically unknown number of clusters needed. Additionally, many conventional clustering solutions operate successfully only when a similarity function follows a specified distribution. A need in the art therefore exists for a system and method that overcomes one or more of the above-described limitations.

SUMMARY OF THE INVENTION

In one aspect of the present invention, a computer-implemented method for generating a cluster of data points from a set of data points can include the steps of selecting, by a computer, a first data point from the set of data points; providing, by the computer, for a first cluster of data points; associating, by the computer, the first data point with the first cluster; evaluating, by the computer, a similarity function including a value measuring a similarity of the first data point and each remaining data point in the set of data points to determine if each remaining data point is similar to the first data point; associating, by the computer, each remaining data point that is determined to be similar to the first data point with the first cluster; and consolidating, by the computer, data stored in data points associated with the first cluster to create a consolidated data point.

In another aspect of the present invention, a computer program product comprises a computer-readable medium that includes computer-readable program code for grouping a set of data points. The computer-readable program code includes computer-readable program code for estimating a similarity function for each pair of data points in the set of data points, the similarity function including a value corresponding to a similarity between each respective pair of data points in the set of data points; and computer-readable program code for executing an algorithm for grouping the set of data points for at least one iteration. The algorithm includes the steps of selecting a first data point from the set of data points; providing for a first cluster of data points; associating the first data point with the first cluster; evaluating a similarity function including a value measuring a similarity of the first data point and each remaining data point in the set of data points to determine if each remaining data point is similar to the first data point; associating each remaining data point that is determined to be similar to the first data point with the first cluster; and updating each respective similarity function.

In another aspect of the present invention, a system for generating a cluster of data points can include a clustering module for executing an algorithm for grouping the set of data points for at least one iteration; and a similarity updating module for updating similarity functions. The algorithm can include the steps of selecting a first data point from the set of data points; providing for a first cluster; associating the first data point with the first cluster; evaluating a similarity function comprising a value measuring a similarity of the first data point and each remaining data point in the set of data points to determine if each remaining data point is similar to the first data point; and associating each remaining data point that is determined to be similar to the first data point with the first cluster.

In another aspect of the present invention, a computer-implemented method for generating clusters of data points from a set of data points can include the steps of (a) selecting, by a computer, a data point from the set of data points; (b) providing, by the computer, for a cluster; (c) associating, by the computer, the selected data point with the cluster; (d) evaluating, by the computer, a similarity function including a value measuring a similarity of the selected data point and each remaining data point in the set of data points to determine if each remaining data point is similar to the selected data point; (e) associating, by the computer, each remaining data point that is determined to be similar to the selected data point with the cluster; (f) determining, by the computer, whether there are any data points in the set of data points that have not been associated with a cluster; and (g) based on a determination that there is at least one data point remaining in the set of data points that has not been associated with a cluster, repeating steps (a) through (f) using only the data points that have not been associated with a cluster until all of the data points originally in the set of data points have been associated with a cluster.

These and other aspects, objects, and features of the present invention will become apparent from the following detailed description of the exemplary embodiments, read in conjunction with, and reference to, the accompanying drawings.

DETAILED DESCRIPTION OF THE EXEMPLARY EMBODIMENTS

Overview

One or more aspects of the invention can comprise a computer program that embodies the functions described herein and illustrated in the appended flow charts. However there are many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed invention will be explained in more detail in the following description, read in conjunction with the figures illustrating the program flow.

A method and system for clustering data points and consolidating information stored in the data points will now be described with reference to FIGS. 1-7, which depict representative or illustrative embodiments of the invention.

System Architecture

Figure 1:
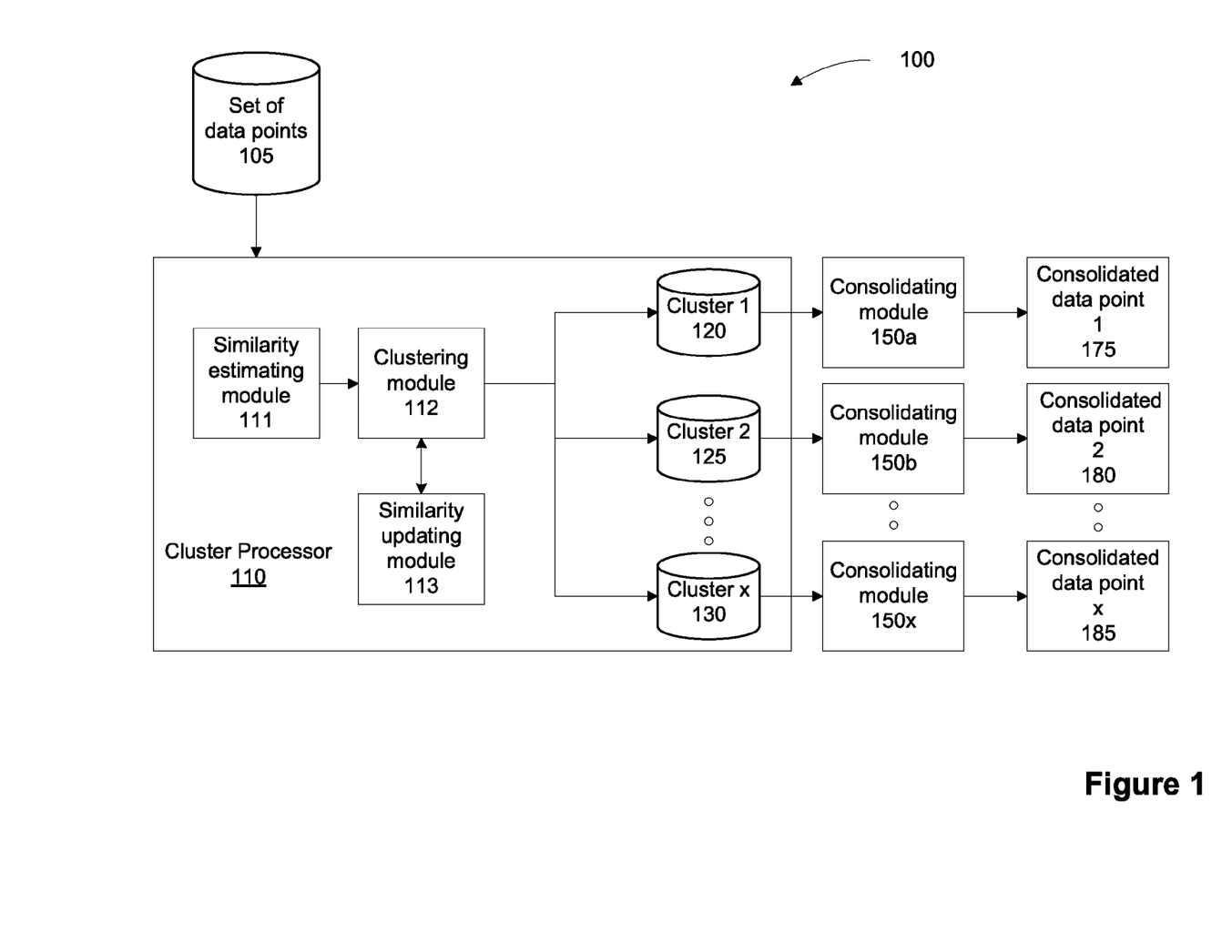
FIG. 1 is a block diagram depicting a system for consolidating data according to an exemplary embodiment.

FIG. 1 is a block diagram depicting a system 100 for consolidating data according to an exemplary embodiment. The exemplary system 100 includes a cluster processor 110. The cluster processor 110 can receive and group a set of data points 105 into a plurality of clusters 120, 125, 130 based on a pairwise similarity function between each pair of data points in the set of data points 105. The cluster processor 110 can include a similarity estimating module 111, a clustering module 112, and a similarity updating module 113.

The similarity estimating module 111 can estimate a pairwise similarity function between each data point and each other data point in the set of data points 105. The data points can be any data type and include information relating to the data point. Exemplary data types include database entries and microarray data. The pairwise similarity function can describe whether two data points are similar or not. For example, the pairwise similarity function can describe whether data included in one data point is similar to data stored in a second data point. If the data points include information regarding businesses in a certain area, two data points having the same business name and similar contact information may be deemed similar by the similarity estimating module 111.

In certain exemplary embodiments, the pairwise similarity function can be a binary value (0 or 1). In certain alternative embodiments, the pairwise similarity function can be a fuzzy logic value between 0 and 1, inclusive. Any values or range of values can be used to describe the similarity between a pair of data points. As used herein, a pairwise similarity function value of or close to 0 indicates that the two data points are similar. Similarly, a pairwise similarity function value of or close to 1 indicates that the pair of data points are dissimilar. Higher values (up to 1) indicate more dissimilarity.

The clustering module 112 executes a clustering algorithm (not shown) to provide for a number (x) of clusters 120, 125, 130 and assigns data points within the set of data points 105 to the clusters 120, 125, 130 based upon the estimated pairwise similarity functions. The number (x) of clusters can be an unknown prior to executing the clustering algorithm and can vary from one execution of the clustering algorithm to the next based on the data points in the set of data points 105, the estimated pairwise similarity function for each pair of data points, and random or pseudo-random selection of an initial data point assigned to each cluster.

The clustering module 112 can execute the clustering algorithm once or multiple times on the set of data points 105. In certain exemplary embodiments, the clustering module 112 can execute the clustering algorithm a predetermined number of iterations. As described below, in certain exemplary embodiments, the clustering module 112 can execute the clustering algorithm and aggregate the results until a measure of distance from the pairwise similarity function being non-transitive is reached.

The similarity updating module 113 can update the pairwise similarity function for each pair of data points after one or more iterations of the clustering algorithm and communicate the updated pairwise similarity functions to the clustering module 112. The clustering module 112 can then use the updated pairwise similarity functions for successive iterations of the clustering algorithm.

A consolidating module 150 can receive a cluster 120, 125, 130 from the cluster processor 110. The received cluster 120, 125, 130 can include each data point associated with the cluster 120, 125, 130 and information stored in those data points. The consolidating module 150 can aggregate or consolidate the information stored in each data point of the received cluster 120, 125 and 130. The consolidated information can be stored in a consolidated data point 175, 180, 185 and can be output by the cluster processor 110 via a user interface (not shown).

Process

Figure 2:
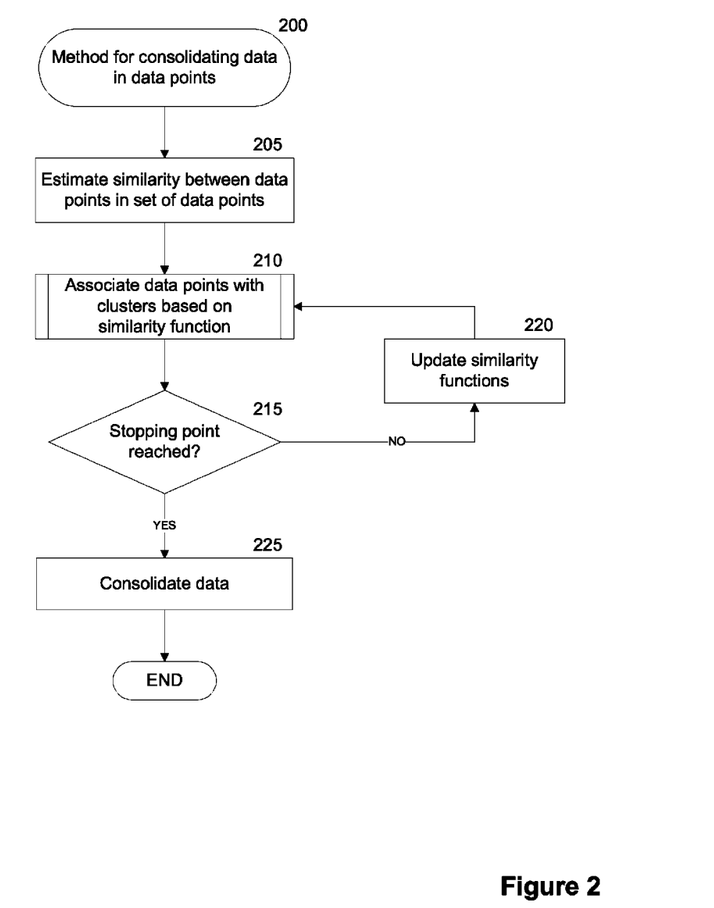
FIG. 2 is a flow chart depicting a method for consolidating data according to an exemplary embodiment.

FIG. 2 is a flow chart depicting a method 200 for consolidating data according to an exemplary embodiment. The method 200 will be described with reference to FIGS. 1 and 2.

The method 200 can assume that there exists an unknown "true" correct way to cluster the set of data points 105. Such a scenario is realistic and arises in cases such as duplicate detection and elimination in large data (also known as the record linkage problem). The method 200 includes execution of a clustering algorithm that accepts a pairwise similarity function for each pair of data points as input and outputs a clustering of the data points based on the pairwise similarity functions. If the input similarity functions "respects" the true clustering, then the output will respect the true clustering.

Referring to FIGS. 1 and 2, in step 205, similarity between data points in the set of data points 105 is estimated. In one exemplary embodiment, the similarity estimating module 111 can estimate a pairwise similarity function, designated herein by "h," for each data point and each other data point in a set of data points 105. The set of data points 105 can include any number "n" of data points. In a simple example, the set of data points 105 can include three data points, "u," "v," and "w." The pairwise similarity function for the pair of data points u and v can be designated as h(u,v). Likewise, the pairwise similarity function for the pair of data points v and w can be designated as h(v,w) and the pairwise similarity function for the pair of data points u and w can be designated as h(u, w). Per the convention discussed above, a lower value for h(u,v) indicates greater similarity between data point "u" and data point "v." Similarly, a higher value for h(u,v) indicates less similarity between data point "u" and data point "v." The estimated pairwise similarity function may not be transitive for a "triplet" of data points. An example of nontransitivity for the triplet of data points (u,v,w) can be h(u,v)=h(v,w)=0 and h(u,w)=1. That is, the pair of data points u and v are considered to be similar and the pair of data points v and w are considered to be similar, while the pair of data points u and w are considered to be dissimilar.

In various embodiments, the pairwise similarity function can be estimated according to a variety of ways. Many suitable similarity functions, known to those of ordinary skill in the art having the benefit of the present disclosure, could be used. In certain exemplary embodiments, a classifier can be trained to decide whether two data points are similar. In certain embodiments, the pairwise similarity function can be a machine-learned binary similarity (or dis-similarity) classifier. Additionally or alternatively, the pairwise similarity function for each pair of data points in the set of data points may be entered by a user or received from another system. In such an embodiment, a similarity estimating module 111 may not be necessary.

In step 210, the data points in the set of data points 105 are associated with one or more clusters 120, 125, 130 based on the pairwise similarity functions. Step 210 will be described in greater detail with reference to FIG. 3, which depicts a method 210 for clustering data points according to an exemplary embodiment.

In step 215, the clustering module 112 determines whether a stopping point is reached. If so, the method 200 proceeds to step 225. If not, the method 200 proceeds to step 220.

In certain embodiments, the stopping point can be a number of iterations of step 210 to be executed, and when that number of iterations has been reached, the stopping condition is satisfied. In certain alternative embodiments, a decision to stop can be based on a measure of transitivity of the pairwise similarity function "h." For example, the stopping condition may not be satisfied until all triplets of data points are transitive (e.g., where h(u,v)=h(v,w)=0, and h(u,w)=0). In another example, the stopping condition may be satisfied if the number of triplets of data points that are nontransitive (e.g., where h(u,v)=h(v,w)=0 and h(u,w)=1) is low based on some criteria. Exemplary criteria can be a number K of triplets that are nontransitive, where K is a predetermined constant multiplied by $n^3$. Various other suitable stopping conditions can be used in addition to the foregoing examples, as may be recognized by one of ordinary skill in the art.

In step 220, the similarity updating module 113 updates the pairwise similarity functions based on previous clustering. In certain embodiments, the pairwise similarity function can be updated between successive iterations of step 210. The pairwise similarity function also can, in certain embodiments, be updated after a number of iterations of step 210.

In various embodiments, the pairwise similarity function for each pair of data points can be updated in a variety of ways. In certain exemplary embodiments, a counter (not shown) can count the number of times that a pair of data points are grouped into the same cluster 120, 125, 130. Another counter can count the total number of iterations of step 210. After a number of iterations of step 210 have completed, a ratio of the number of times that the pair of data points were grouped into the same cluster 120, 125, 130 to the total number of iterations of step 210 can be calculated. If the ratio is greater than a threshold, such as ½, then the pairwise similarity function for that pair of data points can be updated to a value of zero, indicating that the pair of data points are similar. If the ratio is less than ½, then the pairwise similarity function for that pair of data points can be updated to a value of one, indicating that the pair of data points are dissimilar. After updating the pairwise similarity functions for each pair of data points, the counters can be reset.

In certain exemplary embodiments where the pairwise similarity function can have a value between zero and one, the pairwise similarity function for a pair of data points can be updated with the ratio of the number of times that the pair of data points was not grouped into the same cluster 120, 125, 130 to the total number of iterations of step 210. For example, if data points u and v were grouped into different clusters for four out of five iterations of step 210, the updated pairwise similarity function h(u,v) would equal ⅘. This update to the pairwise similarity functions could occur between each successive iteration of step 210 or after a number of iterations of step 210 have completed. In certain exemplary embodiments, the counters could be reset after each update to the pairwise similarity functions. In certain exemplary embodiments, the counters can continue to count without reset until the method of step 210 ends.

In certain exemplary embodiments, the pairwise similarity functions can be updated based on predetermined constants. For example, if the ratio of the number of times that the pair of data points was not grouped into the same cluster 120, 125, 130 to the total number of iterations of step 210 is greater than a constant $c_1$, the pairwise similarity function for the pair of data points can be updated to a value of one. Also, if the ratio is less than a constant $c_2$, the pairwise similarity function for the pair of data points can be updated to a value of zero. If the ratio falls between the two constants $c_1$ and $c_2$, the pairwise similarity function for the pair of data points can remain unchanged until the ratio breaches one of the constants $c_1$ or $c_2$. Using the above convention where a similarity function at or close to a value of zero describes similar data points and a similarity function at or close to a value of one describes dissimilar data points, the constant $c_1$ may have a value of 0.9 and the constant $c_2$ may have a value of 0.1. In another example, the value of $c_1$ may be ⅚ while the value of $c_2$ is ⅙. After the pairwise similarity function for a pair of data points is updated, counters for that pair of data points can be reset.

In step 225, the consolidating module 150 consolidates data stored in the data points in each cluster 120, 125, 130. In certain embodiments, the consolidating module 150 can extract data from each data point in a cluster 120, 125, 130 and store the data in a consolidated data point 175, 180, 185, respectively. In certain embodiments duplicate data in the data points in a cluster 120, 125, 130 can be detected and eliminated. Although step 225 is depicted in FIG. 2 to occur directly after step 215, in certain embodiments, step 210 can be executed for a final iteration after the stopping condition is satisfied but prior to consolidating the data in step 225.

Figure 3:
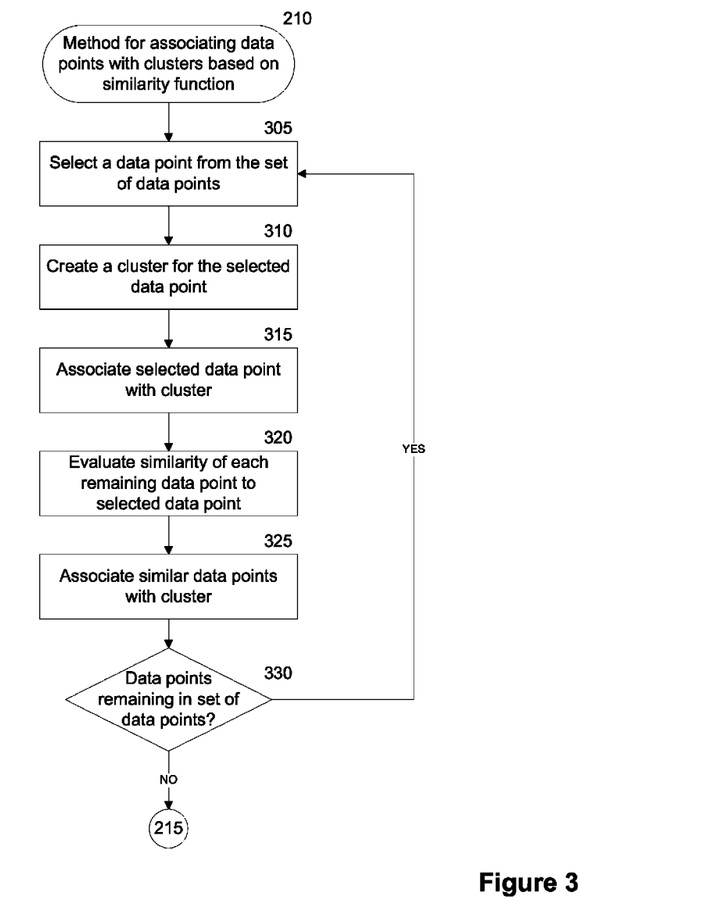
FIG. 3 is a flow chart depicting a method for associating data points with clusters based on a similarity function according to an exemplary embodiment.

FIG. 3 is a flow chart depicting a method 210 for associating data points with clusters 120, 125, 130 based on a similarity function, according to an exemplary embodiment, as referenced in step 210 of FIG. 2. The method 210 will be described with reference to FIGS. 1 and 3.

The method 210 can include using a pairwise similarity function to generate a clustered set of data points. This method 210 can efficiently eliminate local transitivity inconsistencies and result in a globally consistent clustering. The output clustering from an exemplary method such as method 210 can be provably guaranteed to contain not more than twice the number of errors as the input pairwise similarity function on average. The method 210 can be made deterministic by repeating the method 210 and aggregating the results.

In step 305, the clustering module 112 selects a data point from the set of data points 105. In certain embodiments, the clustering module 112 selects a data point uniformly at random. In an alternative embodiment, the data point selected can be selected according to a specified or pseudo-random method. If the data point is selected randomly or pseudo-randomly, certain guarantees to the output of method 210 can be proven.

In step 310, the clustering module 112 provides for a cluster 120 for storing similar data points from the set of data points 105. In a particular embodiment, a cluster, such as cluster 120, can include a data structure that includes—or is associated with—the selected data point and all data points from the set of data points 105 that are similar to the selected data point.

In step 315, the clustering module 112 associates the data point selected in step 305 from the set of data points 105 with the cluster 120 created in step 310.

In step 320, the clustering module 112 evaluates the pairwise similarity function of each remaining data point in the set of data points 105 respective to the selected data point to determine if each remaining data point is similar to the selected data point. In certain exemplary embodiments, the clustering module 112 determines a data point to be similar to the selected data point if the value of the pairwise similarity function for the pair of data points is zero. In certain exemplary embodiments, the clustering module 112 determines a data point to be similar to the selected data point if the value of the pairwise similarity function for the pair of data points is below a constant.

In step 325, the clustering module 112 associates each data point of the set of data points 105 determined to be similar to the selected data point with the cluster 120 created in step 310. If there are data points that are determined to be dissimilar to the selected data point, those data points that are dissimilar can remain in the set of data points 105.

In step 330, the clustering module 112 determines whether there are any data points remaining in the set of data points 105. If so, the method 210 returns to step 305, where another data point is selected from those data points remaining (i.e., those that have not been associated with a cluster) in the set of data points 105. Otherwise, the method 210 proceeds to step 215, as referenced in FIG. 2.

Figure 7:
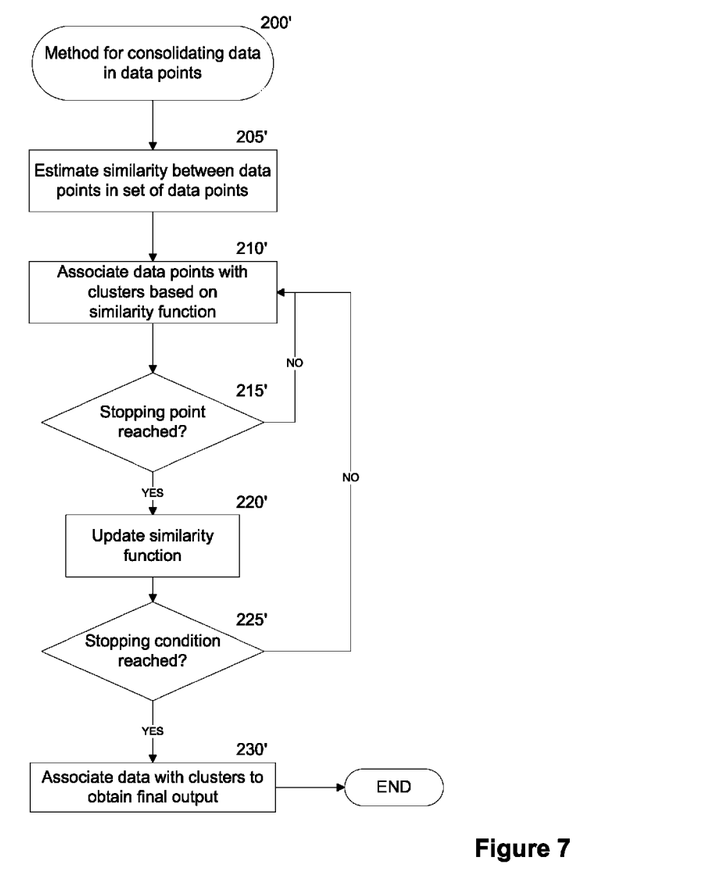
FIG. 7 is a flow chart depicting an alternative method for consolidating data according to an exemplary embodiment.

FIG. 7 is a flow chart depicting an alternative method 200' for consolidating data according to an exemplary embodiment. In a particular embodiment, the method 200' can be performed as an alternative to the method 200 described above with reference to FIG. 2. In other embodiments, some steps of both methods 200, 200' can be used to form a hybrid method embodiment for consolidating data, as will be recognized by one of ordinary skill in the art having the benefit of the present disclosure. In one embodiment, the method 200' shown in FIG. 7 can be performed for several iterations, with aggregated results of the clustering method being used to consolidate the data.

In step 205', a similarity between data points in the set of data points 105 is estimated. This step 205' can be substantially the same as step 205 described above with reference to FIG. 2.

In step 210', the data points in the set of data points 105 are associated with one or more clusters 120, 125, 130 based on the pairwise similarity functions. Again, this step 210' can be substantially the same as step 210 described above with reference to FIG. 2.

In step 215', the clustering module 112 determines whether a stopping point is reached. In one exemplary embodiment, the method 200' can keep a simple counter of the number of times the step 210' is to be repeated, or in other words, the number of iterations to be run. Once that number of iterations has been reached, the stopping condition can be considered satisfied. If the stopping point has been reached, the method 200' proceeds to step 220'. If not, the method 200' returns to step 210' after incrementing a counter, as a new iteration will be performed.

In step 220', the similarity updating module 113 updates the pairwise similarity function based on previous clustering. As described above with reference to FIG. 2, in certain exemplary embodiments, the pairwise similarity function can be updated between successive iterations of step 210'. The pairwise similarity function also can, in certain exemplary embodiments, be updated after a number of iterations of step 210'.

In step 225', the method 200' determines whether the stopping condition has been reached. If the stopping condition has been reached, the method 200' proceeds to step 230'. Otherwise, the method 200' returns to step 210. In one exemplary embodiment, the stopping condition of step 225' can be a simple counter like the stopping point of step 215'. For example, the stopping condition also can count the number of iterations to be performed, and be satisfied when the number of iterations has reached a given number.

In an alternative embodiment, the stopping condition can be based on a measure of transitivity of the pairwise similarity function "h." For example, the stopping condition may not be satisfied until all triplets of data points are transitive (e.g., where $h(u,v)=h(v,w)=0$, and $h(u,w)=0$). In another example, the stopping condition may be satisfied if the number of triplets of data points that are nontransitive (e.g., where $h(u,v)=h(v,w)=0$ and $h(u,w)=1$) is low based on some criteria. Exemplary criteria can be a number K of triplets that are nontransitive, where K is a predetermined constant multiplied by $n^3$. Various other suitable stopping conditions can be used in addition to the foregoing examples, as may be recognized by one of ordinary skill in the art.

In step 230', the consolidating module 150 associates the data stored in the data points in each cluster 120, 125, 130 with each other to obtain a final output. In certain exemplary embodiments, the consolidating module 150 can extract data from each data point in a cluster 120, 125, 130 and store the data in a consolidated data point 175, 180, 185, respectively. In certain exemplary embodiments duplicate data in the data points in a cluster 120, 125, 130 can be detected and eliminated. After step 230', the method 200' ends.

Example

Figure 4:
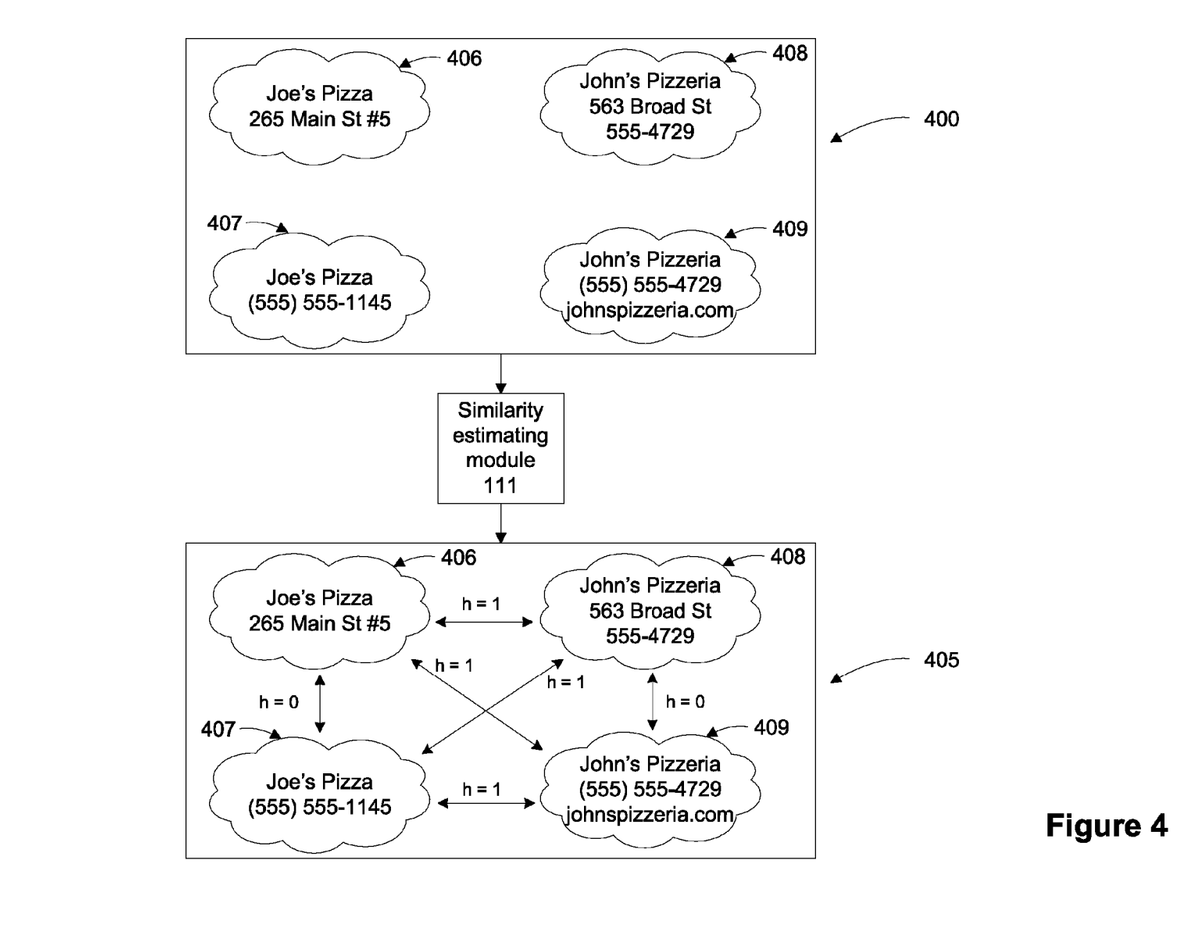
FIG. 4 is a block diagram depicting estimated pairwise similarity functions according to an exemplary embodiment.

To illustrate the operation of one embodiment of the invention, an example is provided. The example disclosed herein is not intended to limit the scope of the foregoing disclosure, and instead, is provided solely to illustrate one particular embodiment of the invention as it relates to one specific set of data points 400.

FIG. 4 is a block diagram depicting estimated pairwise similarity functions according to an exemplary embodiment. In this exemplary embodiment, a set of data points 400 includes four data points 406-409. Each data point includes data relating to a pizza restaurant. For example, data point 406 includes the name "Joe's Pizza" and address "265 Main St #5" of a pizza restaurant, and data point 409 includes the name, telephone number, and website of another pizza restaurant.

The data points 406-409 are depicted in the set of data points 405 with pairwise similarity functions "h" estimated by similarity estimating module 111. Per the convention described above, a pairwise similarity function of zero indicates that the pair of data points is similar while a pairwise similarity function of one indicates that the pair of data points are dissimilar.

Because data point 406 and data point 407 have the same name, "Joe's Pizza," the exemplary similarity estimating module 111 estimates that the pair of data points 406-407 are similar (h=0). Likewise, because data points 408 and 409 have the same name, "John's Pizzeria," and similar phone numbers, "555-4729," the similarity estimating module 111 estimates that the pair of data points 408 and 409 are similar (h=0). Because the other pairs of data points—406 and 408, 406 and 409, 407 and 408, and 407 and 409—do not share similar data, the similarity estimating module 111 estimates that the respective pairs are dissimilar (h=1).

Figure 5:
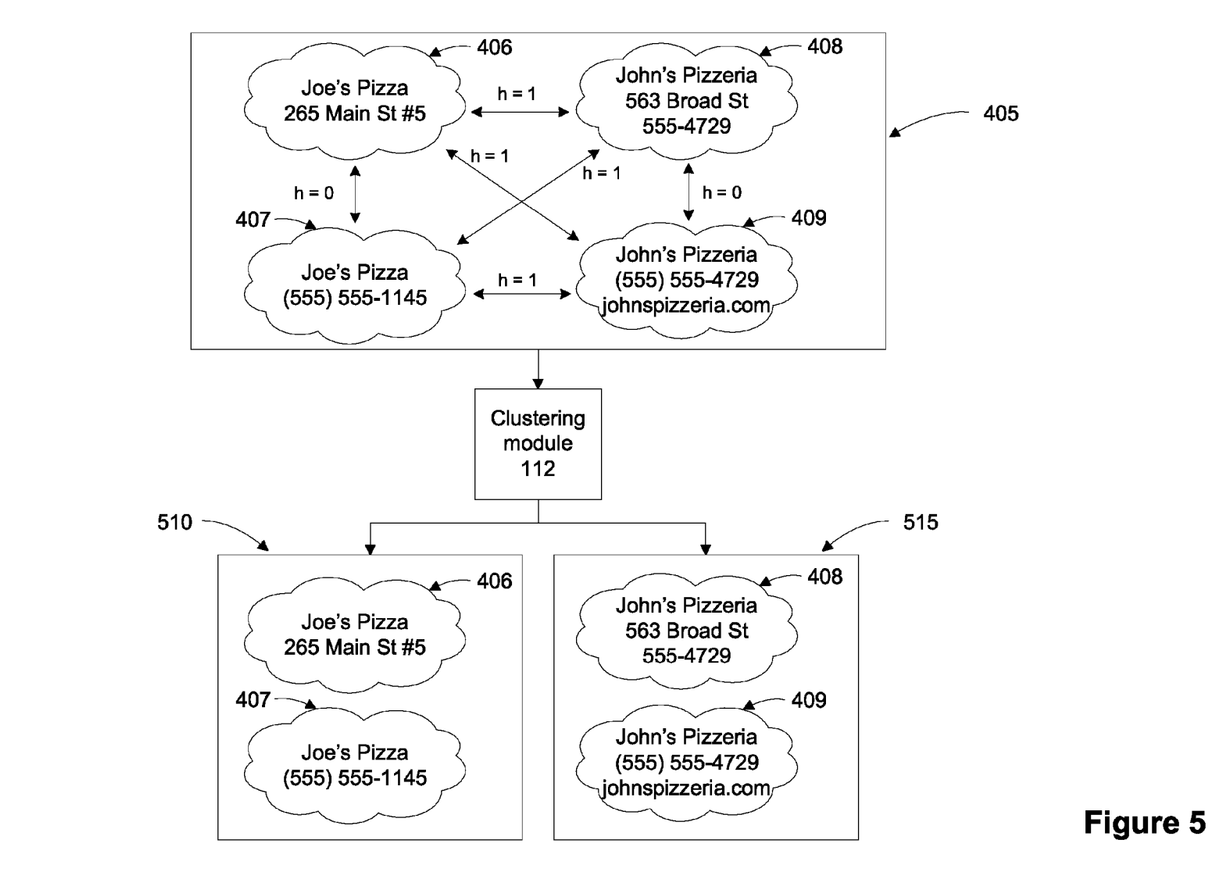
FIG. 5 is a block diagram depicting clusters of data points according to an exemplary embodiment.

FIG. 5 is a block diagram depicting clusters 510 and 515 of data points 406-409 according to an exemplary embodiment. The clustering module 112 can execute a clustering algorithm, such as the exemplary clustering algorithm described above with reference to FIG. 3. Referring to FIG. 3, in the first iteration of the method 210, the clustering module 112 may select data point 406 and create a cluster 510 and associate data point 406 with the created cluster 510. Because the value of the pairwise similarity function for the pair of data points (406, 407) is zero, the clustering module 112 associates data point 407 with the cluster 510 associated with data point 406. Because the values of the pairwise similarity functions for the pairs of data points (406, 408) and (406, 409) are one, data points 408 and 409 remain in the set of data points 405 for a second iteration of method 210. In the second iteration, the clustering module 112 creates a second cluster 515 and associates data point 408 with the second cluster 515. Because the value of the similarity function for the pair of data points (408, 409) is zero, the clustering module 112 associates data point 409 with the second cluster 515 which is associated with data point 408. The result of method 210 is two clusters 510 and 515, each including two data points determined to be similar.

Figure 6:
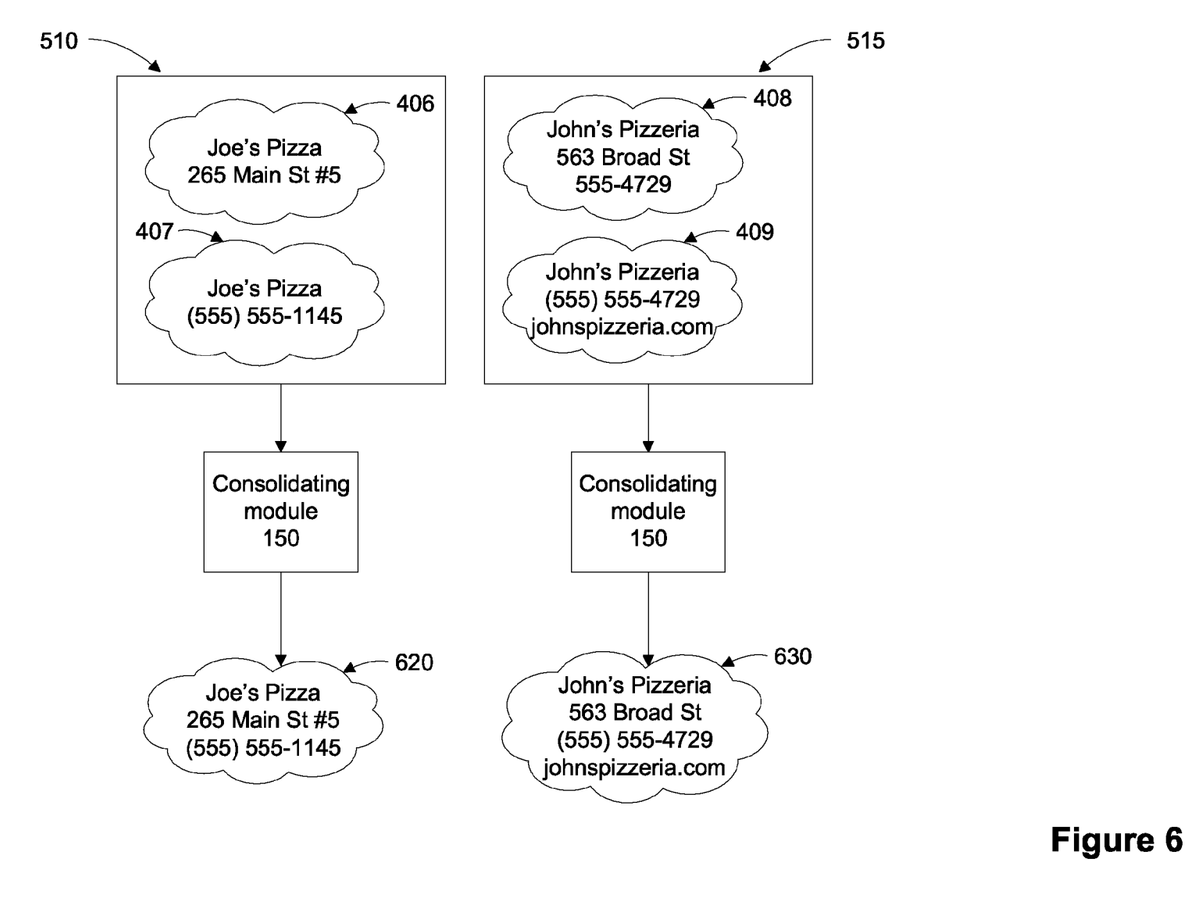
FIG. 6 is a block diagram depicting consolidated data points according to an exemplary embodiment.

FIG. 6 is a block diagram depicting consolidated data points 620 and 630 according to an exemplary embodiment. As discussed above with reference to FIG. 2, the consolidating module 150 can extract data from each data point 406 and 407 in a cluster 510 and create a consolidated data point 620. For example, consolidated data point 620 includes the name of the restaurant, "Joe's Pizza," which is included in both data points 406 and 407. The consolidated data point 620 also includes a street address, "265 Main St #5," extracted from data point 406 and a phone number, "(555) 555-1145," extracted from data point 407. Similarly. the consolidated data point 630 includes information stored in data points 408 and 409. Specifically, data point 630 includes the name of the restaurant, "John's Pizzeria," which is included in both data points 408 and 409. The consolidated data point 630 also included a street address, "563 Broad St," extracted from data point 408 and an Internet address, "johnspizzeria.com," extracted from data point 409. Because the phone numbers stored in data points 408 and 409 are not the same, the consolidating module 150 determines which phone number to include in the consolidated data point 630. In this example, the consolidating module 150 determined that the phone number, "(555) 555-4729," extracted from data point 409 should be included in the consolidated data point 630.

The foregoing example illustrated in FIGS. 4-6 depicts a simple embodiment that could be used to consolidate information obtained using an Internet search engine for display at an Internet web site. For example, a search engine can obtain information regarding businesses (e.g., restaurants, notary publics, hair salons, etc.) in a geographical location from multiple sources (e.g., a directory service, web crawling, etc.). Typically, each business is represented multiple times, so there is a need to identify the multiple information records for each business as one cluster. When a user submits a query for a pizzeria in a certain area, the search engine will return a list of possible clusters corresponding to matching pizzerias. This clustering process can reduce the chance that a single business (e.g., a pizzeria) appears as two separate businesses and also reduce the chance that two competing businesses are hybridized into one search result.

The exemplary methods and steps described in the embodiments presented previously are illustrative, and, in alternative embodiments, certain steps can be performed in a different order, in parallel with one another, omitted entirely, and/or combined between different exemplary methods, and/or certain additional steps can be performed, without departing from the scope and spirit of the invention. Accordingly, such alternative embodiments are included in the invention described herein.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can include program modules and computer readable instructions. The software can be stored on computer readable media for execution by a processor, such as a central processing unit ("CPU") via computer readable memory. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A computer-implemented method for generating a cluster of data points from a set of data points, the method comprising the steps of:

selecting, by a computer, a first data point from the set of data points;

associating, by the computer, the first data point with the cluster;

evaluating, by the computer, a similarity function comprising a value measuring a similarity of the first data point and each remaining data point in the set of data points to determine if each remaining data point is similar to the first data point;

associating, by the computer, each remaining data point that is determined to be similar to the first data point with the cluster; and     consolidating, by the computer, data stored in data points associated with the cluster to create a consolidated data point, wherein consolidating data stored in data points associated with the cluster comprises:

extracting, by the computer, a first data element from one data point of the cluster;

determining, by the computer, a second data element from another data point of the cluster, wherein the second data element is a duplicate of the first data element;

selecting, by the computer, one among the first data element and the second data element to be added to the consolidated data point; and storing, by the computer, the selected data element in the consolidated data point.

2. The computer-implemented method of claim 1, wherein the first data point is randomly selected.

3. A computer program product comprising:
a non-transitory computer-readable storage medium having computer-readable program code embodied therein for grouping a set of data points, the computer-readable program code in the computer program product comprising:
computer-readable program code for estimating a similarity function for each pair of data points in the set of data points; and
computer-readable program code for executing an algorithm for grouping the set of data points for at least one iteration, wherein the algorithm comprises the steps of:
selecting a first data point from the set of data points;
associating the first data point with a cluster;
evaluating the similarity function comprising a value measuring a similarity of the first data point and each remaining data point in the set of data points to determine if each remaining data point is similar to the first data point;
associating each remaining data point that is determined to be similar to the first data point with the cluster;
updating each respective similarity function,
responsive to associating each remaining data point that is determined to be similar to the first data point with the cluster, extracting, by the computer, a first data element from one data point of the cluster;
determining, by the computer, a second data element from another data point of the cluster, wherein the second data element is a duplicate of the first data element;
selecting, by the computer, one among the first data element and the second data element to be added to a consolidated data point; and
responsive to selecting one among the first data element and the second data element, storing, by the computer, the selected data element in the consolidated data point.

4. The computer program product of claim 3, further comprising:
computer readable program code for counting a number of iterations of the algorithm; and
computer-readable program code for terminating the execution of the algorithm based on the number of iterations of the algorithm.

5. The computer program product of claim 3, wherein each respective similarity function is updated based on whether the data points corresponding to each respective similarity function are in the same cluster.

6. The computer program product of claim 3, further comprising:
computer-readable program code for counting a number of iterations of the algorithm; and
computer-readable program code for counting a number of iterations of the algorithm for which the first data point and a second data point are both associated with the cluster.

7. The computer program product of claim 6, wherein each respective similarity function is updated based on a ratio of the number of iterations of the algorithm for which the first data point and the second data point are both associated with the cluster to the number of iterations of the algorithm.

8. The computer program product of claim 3, wherein the first data point is selected using at least one of a random process and a pseudo-random process.

9. A system for generating a cluster of data points from a set of data points, the system comprising:
a memory; and
one or more processors, wherein the one or more processors are configured to:
execute an algorithm for grouping the set of data points for at least one iteration, wherein the algorithm comprises the steps of:
selecting a first data point from the set of data points;
associating the first data point with the cluster;
evaluating a similarity function comprising a value measuring a similarity of the first data point and each remaining data point in the set of data points to determine if each remaining data point is similar to the first data point;
associating each remaining data point that is determined to be similar to the first data point with the cluster;
updating each respective similarity function; and
consolidating data stored in data points associated with the cluster to create a consolidated data point, wherein consolidating data stored in data points associated with the cluster comprises:
extracting, by the computer, a first data element from one data point of the cluster;
determining, by the computer, a second data element from another data point of the cluster, wherein the second data element is a duplicate of the first data element;
selecting, by the computer, one among the first data element and the second data element to be added to the consolidated data point; and
responsive to selecting one among the first data element and the second data element, storing, by the computer, the selected data element in the consolidated data point.

10. The system of claim 9, wherein the processor is configured to estimate a similarity function for each pair of data points in the set of data points.

11. The system of claim 9, wherein each respective similarity function is updated based on whether the data corresponding to each respective similarity function are in the same cluster.

12. The system of claim 11, further comprising:
a first counter for counting a number of iterations of the algorithm; and
a second counter for counting a number of iterations of the algorithm for which the first data point and a second data point are both associated with the cluster.

13. The system of claim 12, wherein each respective similarity function is updated based on a ratio of the second counter to the first counter.

14. The system of claim 9, wherein the first data point is selected using at least one of a random process and a pseudo-random process.

15. A computer-implemented method for generating clusters of data points from a set of data points, the method comprising the steps of:
(a) selecting, by a computer, a data point from the set of data points;

(b) associating, by the computer, the selected data point with a cluster;
(c) evaluating, by the computer, a similarity function comprising a value measuring a similarity of the selected data point and each remaining data point in the set of data points to determine if each remaining data point is similar to the selected data point;
(d) associating, by the computer, each remaining data point that is determined to be similar to the selected data point with the cluster;
(e) determining, by the computer, whether there are any data points in the set of data points that have not been associated with the cluster;
(f) based on a determination that there is at least one data point remaining in the set of data points that has not been associated with the cluster, repeating steps (a) through (f) using only the data points that have not been associated with the cluster until all of the data points originally in the set of data points have been associated with clusters; and
(g) consolidating, by the computer, data stored in data points associated with the first cluster to create a consolidated data point, wherein consolidating data stored in data points associated with the cluster comprises:
    extracting, by the computer, a first data element from one data point of the cluster;
    determining, by the computer, a second data element from another data point of the cluster, wherein the second data element is a duplicate of the first data element;
    selecting, by the computer, one among the first data element and the second data element to be added to the consolidated data point; and
    storing, by the computer, the selected data element in the consolidated data point.

16. The computer-implemented method of claim 15, wherein the selected data point is selected randomly or pseudo-randomly.

17. The computer-implemented method of claim 15, further comprising the step of: (h) repeating steps (a) through (f) until a stopping point is reached.

18. The computer-implemented method of claim 17, wherein the stopping point is based on a measure of transitivity of the data points.

19. The computer-implemented method of claim 15, further comprising the steps of:
    (h) repeating steps (a) through (f) for a number of iterations; and
    (i) aggregating the results of each execution of steps (a) through f and h.

20. The computer-implemented method of claim 15, wherein each data point comprises a pairwise similarity function for each other data point in the set of data points, each pairwise similarity function comprising a measure of similarity between the data point and the other data point.

21. The computer-implemented method of claim 20, further comprising the step of:
    (h) updating, by the computer, the pairwise similarity function for a pair of data points to reflect that the pair of data points are similar if the pair of data points are associated with the same cluster.

22. The computer-implemented method of claim 21, wherein the updated pairwise similarity function is used for successive iterations of steps (a) through (f).

23. The computer-implemented method of claim 15, further comprising the steps of:
    repeating steps (a) through (f) for a number of iterations;
    determining, by the computer, for one of the data points, a number of iterations that the one data point was associated with the same cluster as each other data point;
    determining, by the computer, for the one data point and each other data point, a ratio of the number of iterations that the data point was associated with the same cluster as the other data point to the number of iterations of steps (a) through (f); and
    updating, by the computer, for the data point and each other data point, a similarity function for the pair of data points based on the ratio.

24. The computer-implemented method of claim 23, further comprising the step of repeating steps (a) through (f) using the updated similarity function.

* * * * *